United States Patent
Zheng et al.

(10) Patent No.: US 11,211,083 B1
(45) Date of Patent: Dec. 28, 2021

(54) MAMR HEAD WITH SYNTHETIC ANTIFERROMAGNETIC (SAF) COUPLED NOTCH

(71) Applicant: Western Digital Technologies, Inc., San Jose, CA (US)

(72) Inventors: Yuankai Zheng, Fremont, CA (US); Zheng Gao, San Jose, CA (US); Christian Kaiser, San Jose, CA (US); Zhitao Diao, Fremont, CA (US); Susumu Okamura, Fujisawa (JP); James Mac Freitag, Sunnyvale, CA (US); Alexander Goncharov, Morgan Hill, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/911,296

(22) Filed: Jun. 24, 2020

(51) Int. Cl.
*G11B 5/127* (2006.01)
*G11B 5/31* (2006.01)
*G11B 5/02* (2006.01)
*G11B 5/00* (2006.01)

(52) U.S. Cl.
CPC ........... *G11B 5/1274* (2013.01); *G11B 5/02* (2013.01); *G11B 5/314* (2013.01); *G11B 5/315* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,274,811 B2 | 9/2012 | Zhang et al. | |
| 9,105,279 B2 * | 8/2015 | Shiroishi | G11B 5/02 |
| 9,252,710 B2 | 2/2016 | Wang et al. | |
| 9,425,387 B1 | 8/2016 | Liu et al. | |
| 10,366,714 B1 | 7/2019 | Olson et al. | |
| 10,643,642 B2 * | 5/2020 | De Albuquerque | G11B 5/09 |
| 10,643,643 B1 * | 5/2020 | Gao | G11B 5/1278 |
| 10,734,014 B2 * | 8/2020 | Song | G11B 5/315 |

(Continued)

FOREIGN PATENT DOCUMENTS

WO 2015126326 A1 8/2015

OTHER PUBLICATIONS

Tang, Yuhui et al.; Narrow Track Confinement by AC Field Generation Layer in Microwave Assisted Magnetic Recording: IEEE Transactions on Mahnetics, vol. 44, No. 11, Nov. 2008 (4 pages).

(Continued)

*Primary Examiner* — Tan X Dinh
(74) *Attorney, Agent, or Firm* — Patterson & Sheridan, LLP; Steven H. Versteeg (57) ABSTRACT

Embodiments of the present disclosure generally relate to a write head for a magnetic recording device. The write head includes a spin torque oscillator (STO) that has a seed layer formed on a write pole, a spin polarization layer (SPL) formed on the seed layer, a first spacer layer formed on the SPL, a field generation layer (FGL) formed on the first spacer layer, a second spacer layer formed on the FGL, and a notch formed on the second spacer layer. The FGL and the notch are antiferromagnetically coupled through the second spacer layer and thus increases the FGL angle and improves the write capabilities of the write head.

21 Claims, 8 Drawing Sheets

(56) References Cited

U.S. PATENT DOCUMENTS

| | | | |
|---|---|---|---|
| 10,839,831 B1* | 11/2020 | Nguyen | G11B 5/23 |
| 10,839,832 B1* | 11/2020 | Goncharov | G11B 5/1278 |
| 10,872,626 B2* | 12/2020 | Chembrolu | G11B 5/3146 |
| 10,885,933 B2* | 1/2021 | Li | G11B 5/21 |
| 10,891,976 B1* | 1/2021 | Song | G11B 5/23 |
| 10,943,611 B1* | 3/2021 | Freitag | G11B 5/3146 |
| 10,950,258 B1* | 3/2021 | Gao | G11B 5/1278 |
| 10,957,346 B2* | 3/2021 | De Albuquerque | G11B 5/315 |
| 11,011,190 B2* | 5/2021 | Olson | G11B 5/3133 |
| 2011/0211271 A1 | 9/2011 | Ng et al. | |
| 2012/0126905 A1* | 5/2012 | Zhang | G11C 11/1675 331/94.1 |
| 2013/0229895 A1 | 9/2013 | Shiroishi et al. | |
| 2014/0145792 A1* | 5/2014 | Wang | H01F 10/329 331/94.1 |
| 2020/0234729 A1* | 7/2020 | Olson | G11B 5/012 |

OTHER PUBLICATIONS

Matsubara, Masato et a;.; "Experimental Feasibility of Spin-Torque Oscillator with Synthetic Field Generation Layer for Microwave Assisted Magnetic Recording", AIP, Journal of Applied Physics,109; http://link.aip.org/link/doi/10.1063/1.3559539?ver=pdfcov; 2011 (4 pages.

Zhu, X et al.; Abstract, "Localized Microwave Field Generation for Perpendicular Recording at Deep Subceorcivity", IEEE Explore; https://ieeexplore.ieee.org/abstract/document/4261878 (1 page).

* cited by examiner

MAMR HEAD WITH SYNTHETIC ANTIFERROMAGNETIC (SAF) COUPLED NOTCH

BACKGROUND OF THE DISCLOSURE

Field of the Disclosure

Embodiments of the present disclosure generally relate to a write head of a magnetic recording device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

The STO has a field generation layer (FLG) that generates a high frequency field that can reduced a switching field of the magnetic media. The FGL has a fairly small rotational angle, which therefore limits the write capabilities of the MAMR head.

Therefore, there is a need in the art for an improved MAMR write head.

SUMMARY OF THE DISCLOSURE

Embodiments of the present disclosure generally relate to a write head for a magnetic recording device. The write head includes a spin torque oscillator (STO) that has a seed layer formed on a write pole, a spin polarization layer (SPL) formed on the seed layer, a first spacer layer formed on the SPL, a field generation layer (FGL) formed on the first spacer layer, a second spacer layer formed on the FGL, and a notch formed on the second spacer layer. The FGL and the notch are antiferromagnetically coupled through the second spacer layer and thus increases the FGL angle and improves the write capabilities of the write head.

In one embodiment, a write head comprises: a main pole; a first spacer layer disposed adjacent the main pole; a field generation layer (FGL) coupled to the first spacer layer; a second spacer layer coupled to the FGL; a notch coupled to the second spacer layer; and a trailing shield coupled to the notch.

In another embodiment, a write head comprises: a main pole; a trailing shield; a Fe layer disposed between the main pole and the trailing shield; a Co layer disposed between the Fe layer and the trailing shield; a Ru layer disposed between the Co layer and the trailing shield; and a CoFe layer disposed between the Ru layer and the trailing shield.

In another embodiment, a write head comprises: a main pole; a trailing shield; a field generation layer (FGL) disposed between the main pole and the trailing shield; a notch disposed between the FGL and the trailing shield; and means to antiferromagnetically couple the FGL to the notch.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a write head for a magnetic recording device. The write head includes a spin torque oscillator (STO) that has a seed layer formed on a write pole, a spin polarization layer (SPL) formed on the seed layer, a first spacer layer formed on the SPL, a field generation layer (FGL) formed on the first spacer layer, a second spacer layer formed on the FGL, and a notch formed on the second spacer layer. The FGL and the notch are antiferromagnetically coupled through the second spacer layer and thus increases the FGL angle and improves the write capabilities of the write head.

Figure 1:
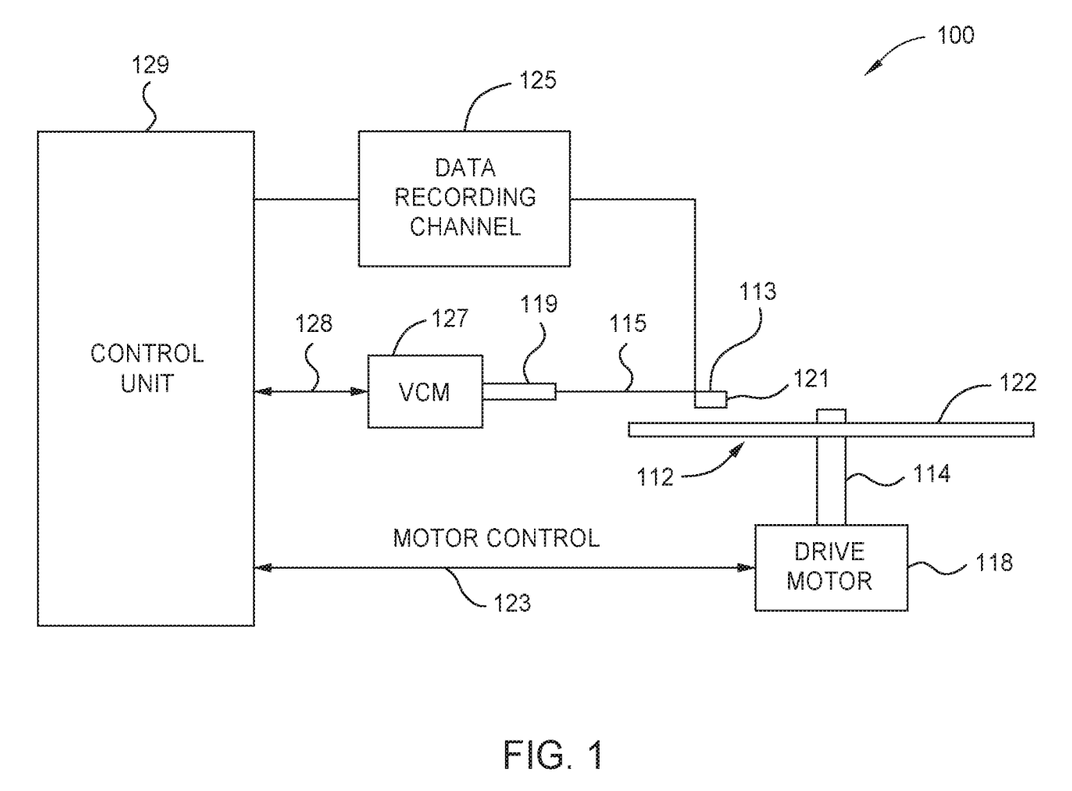
FIG. 1 is a schematic illustration of certain embodiments of a magnetic media drive including a write head.

FIG. 1 is a schematic illustration of certain embodiments of a magnetic media drive including a magnetic write head, such as a head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head including a spintronic device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
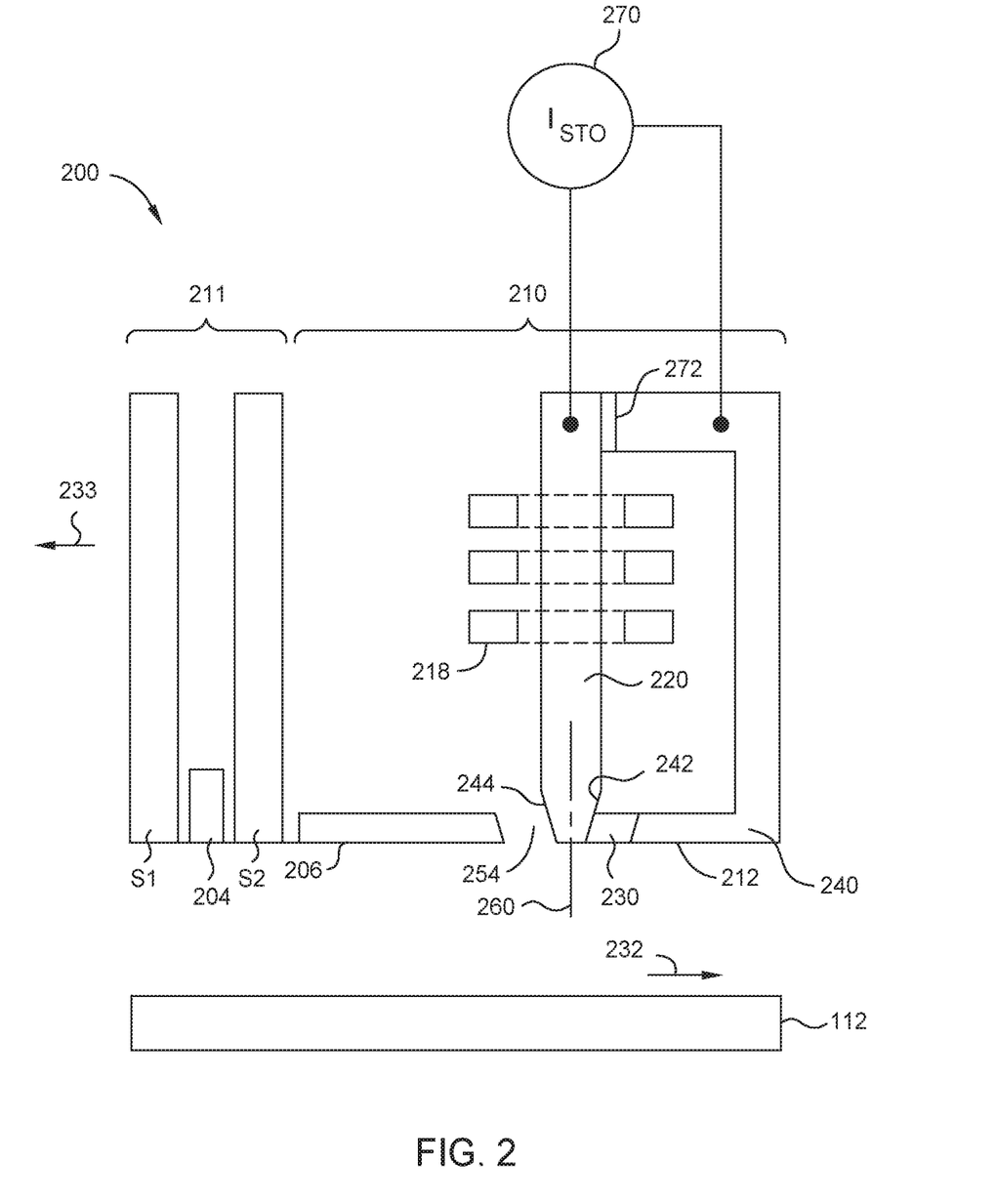
FIG. 2 is a schematic illustration of certain embodiments of a cross sectional side view of a head assembly facing a magnetic recording medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a write head 210. In certain embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the TS 240 has a front portion at the MFS.

The main pole 220 comprises a magnetic material, such as CoFe, CoFeNi, or FeNi, other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The TS 240 comprises a magnetic material, such as FeNi, or other suitable magnetic materials, serving as a second electrode and return pole for the main pole 220. The leading shield 206 may provide electromagnetic shielding and is separated from the main pole 220 by a leading gap 254.

The spintronic device 230 is positioned proximate the main pole 220 and reduces the coercive force of the magnetic recording medium, so that smaller writing fields can be used to record data. An electron current is applied to spintronic device 230 from a current source 270 to produce a microwave field. The electron current may be a direct current (DC) waveforms, pulsed DC waveforms, and/or pulsed current waveforms going to positive and negative voltages, or other suitable waveforms.

In certain embodiments, the spintronic device 230 may be electrically coupled to the main pole 220 and the TS 240 in which the main pole 220 and the TS are separated by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In other embodiments, the spintronic device 230 may be coupled to electrical leads providing an electron current other than from the main pole and/or the TS.

Figure 3:
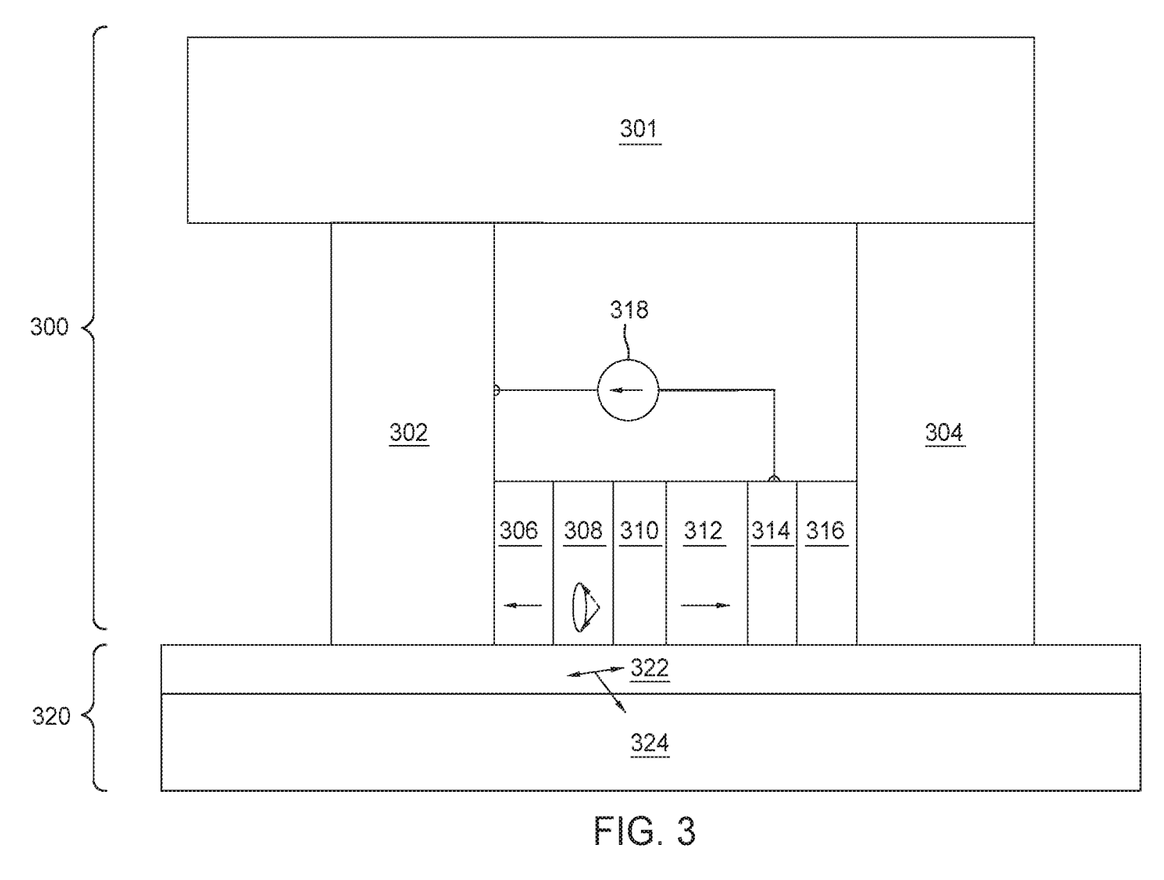
FIG. 3 is a schematic illustration of a MAMR write head and magnetic recording medium according to one embodiment.

FIG. 3 is a schematic illustration of a MAMR write head 300 and magnetic recording medium 320 according to one embodiment. Aspects of the description of FIG. 1 and FIG. 2 may be similar to the description of the MAMR write head 300. The MAMR write head 300 includes main pole 302, a trailing shield 304, and a STO that includes a seed layer 306 coupled to the main pole 302, a spin polarization layer (SPL) 308 coupled to the seed layer 306, a first spacer layer 310 coupled to the SPL 308, a field generation layer (FGL) 312 coupled to the first spacer layer 310, a second spacer layer 314 coupled to the FGL 312, and a notch 316 coupled to the second spacer layer 314, where the trailing shield 304 is coupled to the notch 316. Furthermore, a circuit 318 carries a current from the second spacer layer 314 to the main pole 302, where the circuit 318 is connected by an electrode to both the second spacer layer 314 and the main pole 302. The magnetic recording medium 320 includes a thin film medium 322 and a soft underlayer 324.

The seed layer 306 includes ruthenium (Ru), copper (Cu), tantalum (Ta), or combinations thereof. The SPL 308 includes a multilayer structure that includes a first layer including cobalt manganese germanium (CoMnGe) and a second layer including cobalt iron (CoFe). The first spacer layer 310 includes gold (Au), silver (Ag), aluminum (Al), Cu, silver tin (AgSn), nickel aluminum (NiAl), or combinations thereof. The FGL 312 includes a multilayer structure that includes a first layer of Fe and a second layer of Co. The second spacer layer 314 includes Ru, rhodium (Rh), palladium (Pd), or combinations thereof. The second spacer layer 314 may be a synthetic antiferromagnetic (SAF) layer. The notch 316 includes CoFe. Each of the components of the STO may have a relation to another component of the STO. For example, the Co layer of the FGL 312 and the CoFe layer of the notch 316 are antiferromagnetically coupled together due to the materials of the second spacer layer 314. The listed materials are not intended to be limiting, but to provide an example of a possible embodiment. Furthermore, it is contemplated that other materials not listed may be applicable to each of the listed components of the MAMR write head 300.

FIGS. 4A-4D are schematic illustrations of the STO 400, 425, 450, 475 for a MAMR write head at various stages of applied field according to another embodiment. Aspects of the STO 400, 425, 450, 475 for a MAMR write head may be similar to the components of the MAMR write head 300 of FIG. 3. The STO 400, 425, 450, 475 includes a seed layer 404 coupled to the main pole 402, a SPL 406 coupled to the seed layer 404, a first spacer layer 408 coupled to the SPL 406, a FGL 410 coupled to the first spacer layer 408, a second spacer layer 412 coupled to the FGL 410, and a notch 414 coupled to the second spacer layer 412.

In FIGS. 4A-4D, the arrows illustrated within the SPL 406, the FGL 410, and the notch 414 are representations of the magnetic moment of the ferromagnetic material of the component. Furthermore, in the description herein, the magnetic moment may be described using an x-y system. However, the use x-y system to describe the direction of the magnetic moment of the SPL 406, the FGL 410, and the notch 414 is not intending to be limiting, but to be used for exemplary purposes. As described in FIG. 3, the FGL 410 and the notch 414 are antiferromagnetically coupled together, such that the magnetic moment of the FGL 410 and the notch 414 are opposite of each other (e.g., reflected about the x-axis).

Figure 4A:
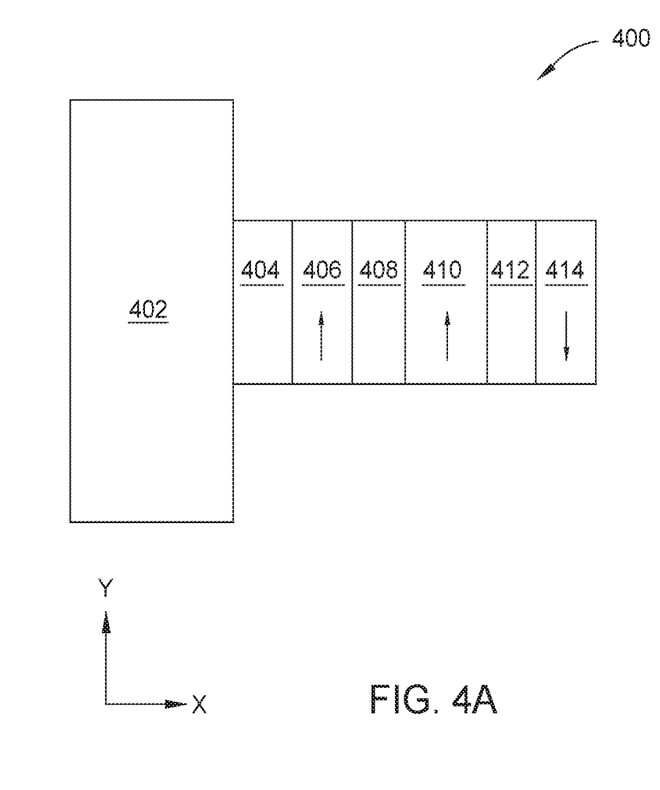
FIGS. 4A-4D are schematic illustrations of the STO for a MAMR write head at various stages of applied field according to another embodiment.

In FIG. 4A, no applied field (magnetic field) (e.g., H=0 Tesla (T)), such as a coil field, is applied to the STO. When there is no applied field, the magnetic moment of both the SPL 406 and the FGL 410 points to the positive y direction. Since the FGL 410 and the notch 414 are antiferromagnetically coupled together due to the SAF second spacer layer 412, the magnetic moment of the notch 414 points to the negative y direction.

Figure 4B:
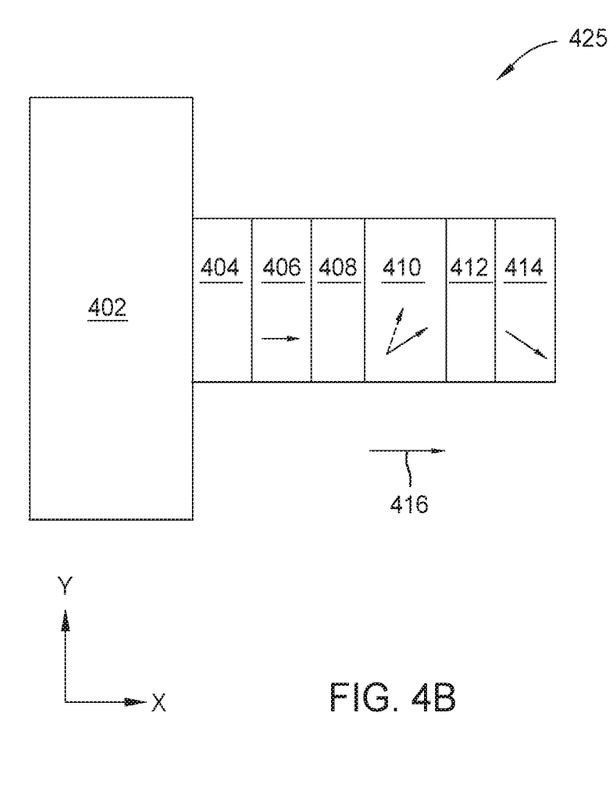

In FIG. 4B, an applied field is applied to the STO 425 along the x-axis. The applied field 416 may be between about 1 T to about 2 T. When the applied field 416 is applied to the STO 425, the magnetic moment of the of the SPL 406 shifts from the positive y direction to the positive x direction. Furthermore, the magnetic moment of the FGL 410 shifts from the positive y direction to a first angle between the positive x direction and the positive y direction. Because the FGL 410 and the notch 414 are antiferromagnetically coupled together due to the SAF second spacer layer 412, the magnetic moment of the notch 414 points to a second angle between the positive x direction and the negative y direction. The first angle of the magnetic moment of the FGL 410 and the second angle of the magnetic moment of the notch 414 are equidistant from the x-axis, such that the second angle is the first angle reflected about the x-axis.

Figure 4C:
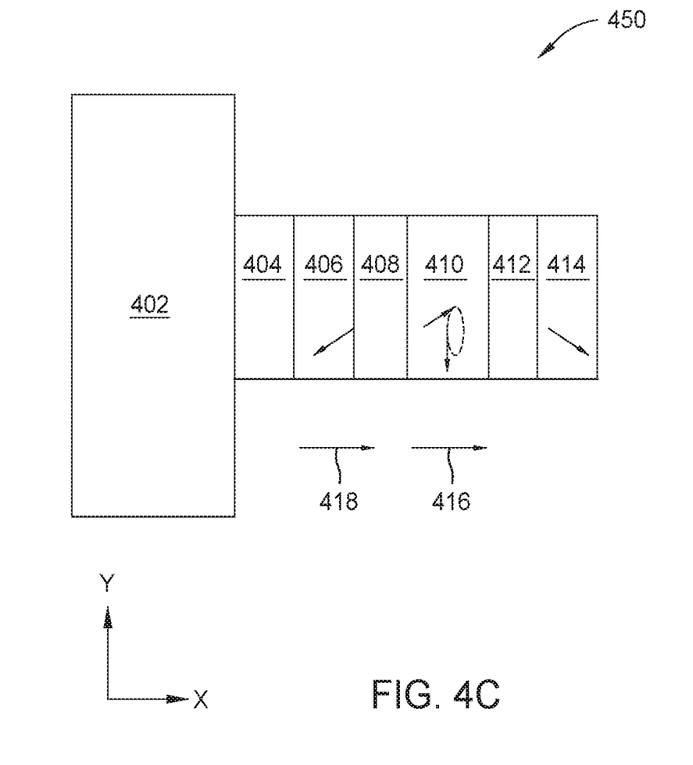

In FIG. 4C, when a large enough current is applied to the STO 450 from right to left, the electrons 418 will move from left to right in the STO 450. The movement of the electrons 418 from left to right may cause the SPL 406 to switch from a magnetic moment in the positive x direction to a third angle between the negative x direction and the negative y direction. The switch of the magnetic moment of the SPL 406 further increases the current applied to the STO 450 and may cause the FGL 410 to generate a high frequency field. The high frequency field is an oscillation of the magnetic moment about the x-axis. When the high frequency field is generated, data is written to the media, such as the magnetic recording medium 320 of FIG. 3.

Figure 4D:
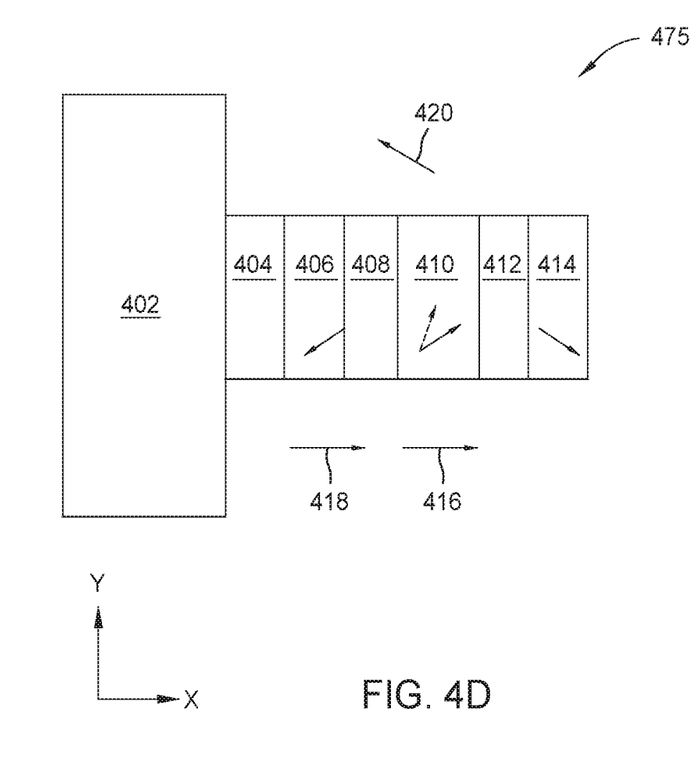

In FIG. 4D, the notch 414 applies a negative field 420 on the FGL 410 caused by the antiferromagnetic coupling of the FGL 410 and the notch 414 due to the SAF second spacer layer 412. The additional negative field 420 applied to the FGL 410 causes the magnetic moment to point at a fourth angle, indicated by the dotted arrow, between the positive x direction and the positive y direction, where the third angle is greater than the first angle between the positive x direction and the positive y direction, with the angles being measured relative to the positive x direction, as described in FIG. 4B. The larger FGL 410 oscillation angle generates a larger frequency field, which may result in improved writes to the magnetic recording medium.

Figure 5:
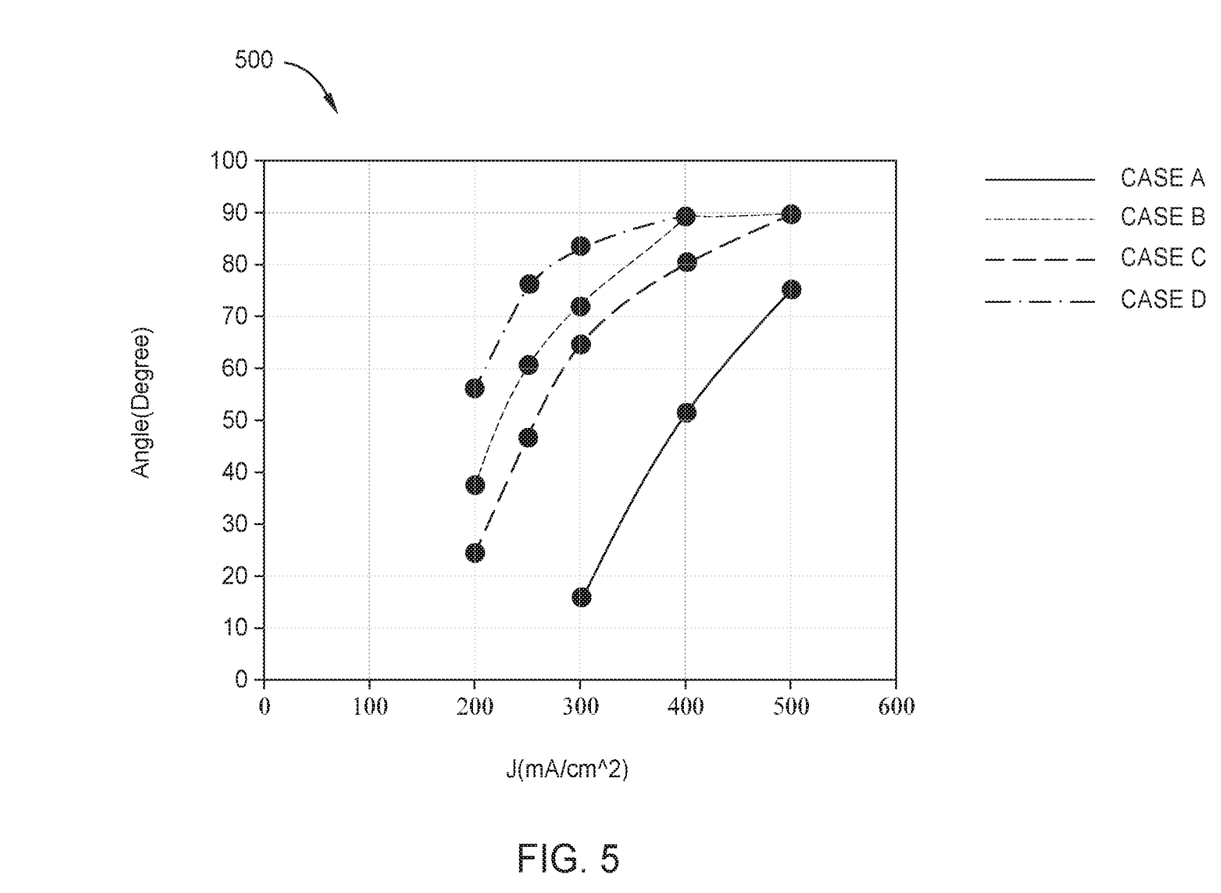
FIG. 5 is a graph illustrating the impact of a strong perpendicular notch.

FIG. 5 is a graph illustrating the impact of a strong perpendicular notch. The notch referenced in FIG. 5 may be the notch 414 of FIGS. 4A-4D and/or the notch 316 of FIG. 3. In FIG. 5, the current density (J), whose SI units are amperes (mA) per meters (m) squared, is graphed on the x-axis and the resulting angle in degrees is graphed on the y-axis. The illustrated values are not intended to be limiting, but to provide an example of a possible embodiment.

The solid line represents the base case (case A), such as a STO with a non-SAF second spacer layer. The dotted line is the case B, the dashed line is the case C, and the dashed-dotted line is the case D. Both case A and case C have a high magnetic saturation and both case B and case D have a magnetic saturation that is less than both case A and case C. The magnetic saturation may be reflective of the strength of the applied field, such as the applied field of FIGS. 4A-4D. Furthermore, case D has a stronger perpendicular notch than that of case C. The perpendicular notch strength corresponds to the strength of the magnetic moment of the notch. When the second spacer layer has a high SAF value, the strength of the perpendicular notch increases.

As shown in case A and case C and, similarly, in case B and case D, by including the SAF second spacer layer, the angle of the magnetic moment of the FGL increases for each value of current density. Furthermore, between case A and case D, where case D experiences a weaker applied magnetic field strength than case A, but due to a strong perpendicular notch, the oscillation angle of case D is greater than the oscillation angle of case A. Thus, the strong perpendicular notch, generated by a high SAF second spacer layer, may result in a greater oscillation angle for weaker applied magnetic field strengths.

Figure 6A:
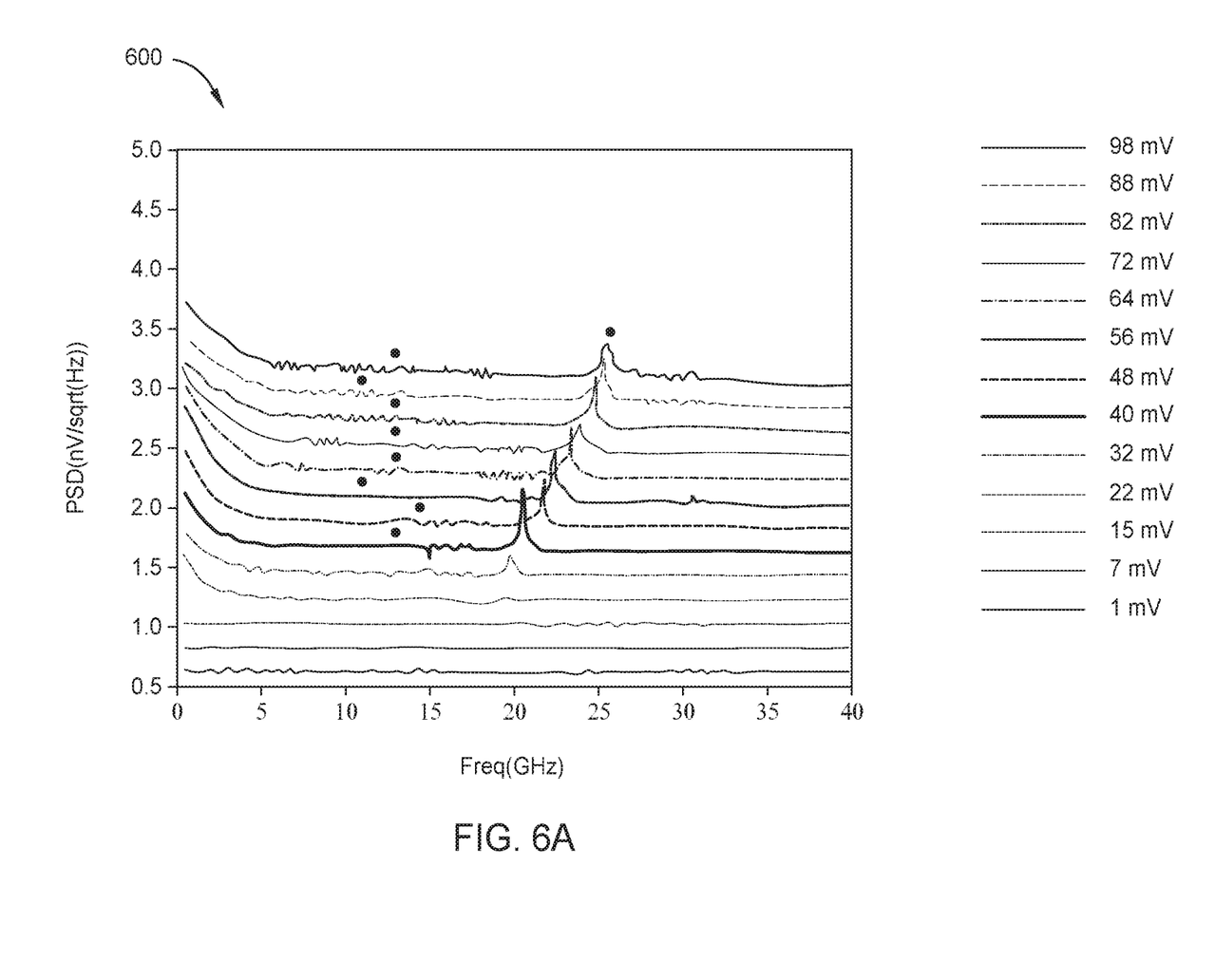
FIGS. 6A and 6B are graphs illustrating the intensity width of a write field for a ferromagnetically coupled and antiferromagnteically coupled STO.
Figure 6B:
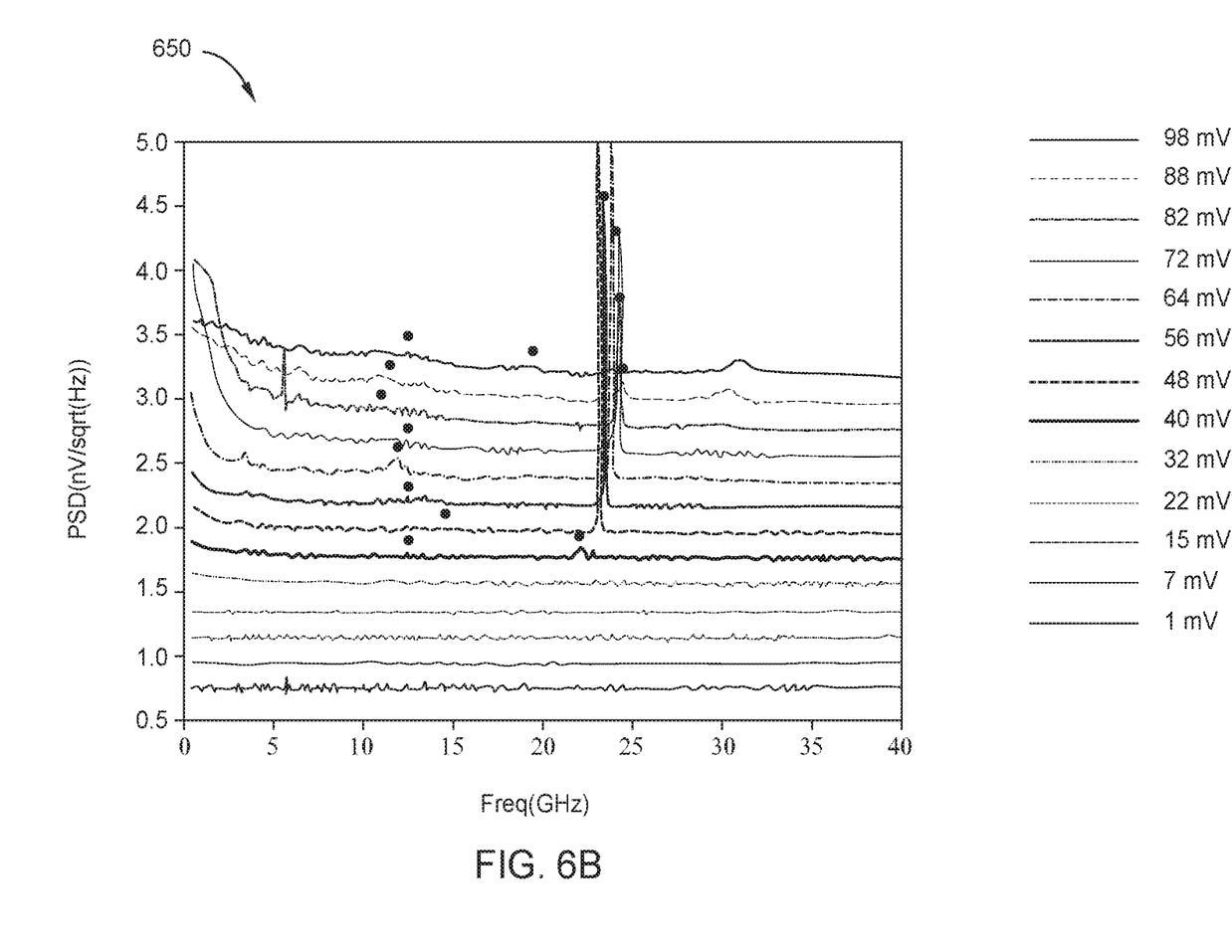

FIG. 6A is a graph 600 illustrating the intensity width of a write field for a ferromagnetically coupled STO, such as using a Cu second spacer layer. Likewise, FIG. 6B is a graph 650 illustrating the intensity width of a write field for an antiferromagnetically coupled STO, such as using a Ru second spacer layer. The frequency (GHz) generated by the oscillation of the magnetic moment of the FGL is graphed on the x-axis and the power spectral density (PSD) (nV/sqrt (Hz)) is graphed on the y-axis. Each curve moving from bottom to top represents a different current, where the bottom curve represents the smallest current and each curve above the bottom curve represents a larger current than the curve below. The PSD for each current at the spike around about 20 GHz to about 25 GHz has a greater intensity and narrower width for the case illustrated in FIG. 6B, describing the antiferromagnetic coupling of the FGL and the notch due to a SAF second spacer layer, than the case illustrated in FIG. 6A, describing the ferromagnetic coupling of the FGL and the notch due a non-SAF second spacer layer.

In one embodiment, a write head comprises: a main pole; a first spacer layer disposed adjacent the main pole; a field generation layer (FGL) coupled to the first spacer layer; a second spacer layer coupled to the FGL; a notch coupled to the second spacer layer; and a trailing shield coupled to the notch. The write head further comprising: a seed layer coupled to the main pole; and a spin polarization layer (SPL) coupled to the seed layer, wherein the first spacer layer is disposed on the SPL. The SPL comprises a multilayer structure. The multilayer structure comprises a first layer comprising CoMnGe and a second layer comprising CoFe. The second spacer layer comprises Ru, Rh, Pd, or combinations thereof. The first spacer layer comprises copper. The notch comprises CoFe. The FGL comprises a multilayer structure. The multilayer structure comprises a first layer of Fe and a second layer of Co. A magnetic recording medium comprising the write head is also disclosed.

In another embodiment, a write head comprises: a main pole; a trailing shield; a Fe layer disposed between the main pole and the trailing shield; a Co layer disposed between the Fe layer and the trailing shield; a Ru layer disposed between the Co layer and the trailing shield; and a CoFe layer disposed between the Ru layer and the trailing shield. The Co layer and the CoFe layer are antiferromagnetically coupled together. The write head further comprises a Cu layer disposed between the main pole and the Fe layer. The write head further comprises a seed layer disposed between the main pole and the Fe layer. The seed layer comprises ruthenium, copper, tantalum, or combinations thereof. The write head further comprises a spacer layer disposed between the main pole and the Fe layer. The spacer layer comprises Au, Ag, Al, Cu, AgSn, NiAl, or combinations thereof. A magnetic recording medium comprising the write head is also disclosed.

In another embodiment, a write head comprises: a main pole; a trailing shield; a field generation layer (FGL) disposed between the main pole and the trailing shield; a notch disposed between the FGL and the trailing shield; and means to antiferromagnetically couple the FGL to the notch. A magnetic recording medium comprising the write head is also disclosed.

By utilizing a perpendicular notch in the STO, the FGL angle can be increased which leads to improved write capabilities of the write head.

It is to be understood that the magnetic recording head discussed herein is applicable to a data storage device such as a hard disk drive (HDD) as well as a tape drive, such as a tape embedded drive (TED) or an insertable tape media drive. An example TED is described in co-pending patent application entitled "Tape Embedded Drive", U.S. patent application Ser. No. 16/365,034, filed Mar. 31, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

While the foregoing is directed to embodiments of the present disclosure, other and further embodiments of the disclosure may be devised without departing from the basic scope thereof, and the scope thereof is determined by the claims that follow.

What is claimed is:
1. A write head, comprising:
   a main pole;
   a first spacer layer disposed adjacent the main pole;
   a field generation layer (FGL) coupled to the first spacer layer;
   a second spacer layer coupled to the FGL;
   a notch coupled to the second spacer layer; and
   a trailing shield coupled to the notch.
2. The write head of claim 1, further comprising:
   a seed layer coupled to the main pole; and
   a spin polarization layer (SPL) coupled to the seed layer, wherein the first spacer layer is disposed on the SPL.
3. The write head of claim 2, wherein the SPL comprises a multilayer structure.
4. The write head of claim 3, wherein the multilayer structure comprises a first layer comprising CoMnGe and a second layer comprising CoFe.
5. The write head of claim 1, wherein the second spacer layer comprises Ru, Rh, Pd, or combinations thereof.
6. The write head of claim 1, wherein the first spacer layer comprises copper.
7. The write head of claim 1, wherein the notch comprises CoFe.
8. The write head of claim 1, wherein the notch is a perpendicular notch.

9. The write head of claim 8, wherein the second spacer layer comprises a material used for synthetic antiferromagnetic structures.

10. A magnetic recording medium comprising the write head of claim 1.

11. A write head, comprising:
a main pole;
a trailing shield;
a Fe layer disposed between the main pole and the trailing shield;
a Co layer disposed between the Fe layer and the trailing shield;
a Ru layer disposed between the Co layer and the trailing shield; and
a CoFe layer disposed between the Ru layer and the trailing shield, the CoFe layer being in contact with the trailing shield.

12. The write head of claim 11, wherein the Co layer and the CoFe layer are antiferromagnetically coupled together.

13. The write head of claim 11, further comprising a Cu layer disposed between the main pole and the Fe layer.

14. The write head of claim 11, further comprising a seed layer disposed between the main pole and the Fe layer.

15. The write head of claim 14, wherein the seed layer comprises ruthenium, copper, tantalum, or combinations thereof.

16. The write head of claim 11, further comprising a spacer layer disposed between the main pole and the Fe layer.

17. The write head of claim 16, wherein the spacer layer comprises Au, Ag, Al, Cu, AgSn, NiAl, or combinations thereof.

18. A magnetic recording medium comprising the write head of claim 11.

19. A write head, comprising:
a main pole;
a trailing shield;
a field generation layer (FGL) disposed between the main pole and the trailing shield;
a notch disposed between the FGL and the trailing shield; and
means to antiferromagnetically couple the FGL to the notch.

20. A magnetic recording medium comprising the write head of claim 19.

21. The write head of claim 11, wherein the CoFe layer is directly in contact with the trailing shield.

* * * * *